United States Patent
Okabe

(10) Patent No.: US 9,581,773 B2
(45) Date of Patent: Feb. 28, 2017

(54) CAGE, COMMUNICATION DEVICE, COMMUNICATION MODULE AND CONNECTING METHOD

(71) Applicant: FUJIKURA LTD., Koto-ku, Tokyo (JP)

(72) Inventor: Susumu Okabe, Sakura (JP)

(73) Assignee: FUJIKURA LTD., Tokyo (JP)

( * ) Notice: Subject to any disclaimer, the term of this patent is extended or adjusted under 35 U.S.C. 154(b) by 215 days.

(21) Appl. No.: 14/518,104

(22) Filed: Oct. 20, 2014

(65) Prior Publication Data

US 2015/0180171 A1 Jun. 25, 2015

(30) Foreign Application Priority Data

Dec. 19, 2013 (JP) .................. 2013-262255

(51) Int. Cl.
*H01R 13/631* (2006.01)
*G02B 6/42* (2006.01)
*H01R 13/516* (2006.01)

(52) U.S. Cl.
CPC .......... *G02B 6/4261* (2013.01); *H01R 13/516* (2013.01)

(58) Field of Classification Search
CPC ............................ G02B 6/4261; H01R 13/516
(Continued)

(56) References Cited

U.S. PATENT DOCUMENTS 5,822,183 A * 10/1998 Kanda .................. G06K 7/0047
361/679.32

5,933,328 A * 8/1999 Wallace ............. G06K 13/0862
257/678

(Continued)

FOREIGN PATENT DOCUMENTS

JP 2008-41338 A 2/2006
JP 2010-170862 A 8/2010
(Continued)

OTHER PUBLICATIONS

Communication dated Feb. 23, 2016 from the Japanese Patent Office in counterpart application No. 2013-262255.
(Continued)

*Primary Examiner* — Edwin A. Leon
(74) *Attorney, Agent, or Firm* — Sughrue Mion, PLLC

(57) ABSTRACT

A cage that a communication module having a module-side connector arranged two-dimensionally with connecting terminals is insertable to/removable from, the cage includes: a movable cage rotatable about a rotation axis, the movable cage having an insertion opening to which the communication module is inserted and a window provided in a position of the module-side connector during inserting of the communication module, the movable cage switching between a first position and a second position by rotating, in the first position, an insertion direction of the communication module to the movable cage being slanted, with respect to a board arranged with a fixed-side connector having connecting terminals arranged two-dimensionally, the communication module being insertable to/removable from the movable cage, in the case that the movable cage is made to be from the first position to the second position in a state where the communication module is inserted, the module-side connector and the fixed-side connector being connected through the window.

11 Claims, 13 Drawing Sheets

(58) Field of Classification Search
USPC ............... 439/342, 630, 326, 136, 131, 135, 439/137–140, 155, 152, 328, 159
See application file for complete search history.

(56) References Cited

U.S. PATENT DOCUMENTS

| | | | | |
|---|---|---|---|---|
| 6,896,548 B2* | 5/2005 | Scuteri | ................ | G06K 7/0021 |
| | | | | 439/326 |
| 7,416,450 B2* | 8/2008 | Wu | ...................... | H04B 1/3816 |
| | | | | 439/630 |
| 2008/0032526 A1 | 2/2008 | Takahashi | | |

FOREIGN PATENT DOCUMENTS

| | | |
|---|---|---|
| JP | 2010-277916 A | 12/2010 |
| JP | 2012-163739 A | 8/2012 |
| JP | 2013-134347 A | 7/2013 |
| WO | 03/054608 A1 | 7/2003 |
| WO | 2009/128413 A1 | 10/2009 |

OTHER PUBLICATIONS

SNAP12 MSA Revisions 1.1 May 15, 2002 (http://www.physik.unizh.ch/~avollhar/snapl2msa_051502.pdf).

\* cited by examiner

COMPARATIVE EXAMPLE

CAGE, COMMUNICATION DEVICE, COMMUNICATION MODULE AND CONNECTING METHOD

CROSS-REFERENCE TO RELATED APPLICATIONS

The present application claims priority upon Japanese Patent Application No. 2013-262255 filed on Dec. 19, 2013, which is herein incorporated by reference.

BACKGROUND

Technical Field

The present invention relates to cages, communication devices, communication modules, and connecting methods.

Related Art

In the field of high-speed optical communication using optical fibers, pluggable optical transceivers that convert electrical signals with optical signals and vice versa are used. With the pluggable optical transceivers, a cage is installed on a main board in a communication device side (host side), an optical module (communication terminal) integrated with a photoelectric conversion element and a circuit board is inserted in the cage, and an optical module-side connector (module-side connector) and a main board-side connector (fixed-side connector) are connected electrically and mechanically. Thus, the optical signals to be transferred and received with the optical fibers and the electrical signals to be processed with the main board in the communication device side can be converted with each other with the photoelectric conversion element and the circuit board in the optical module.

In Japanese Patent Application Laid-open Publication No. 2013-134347, an optical module that is insertable to and removable from a cage is disclosed. The optical module disclosed in Japanese Patent Application Laid-open Publication No. 2013-134347 is integrated with a board shown in FIG. 14, and a card edge connector arranged with multiple connecting terminals in an end portion of the board is formed. In Japanese Patent Application Laid-open Publication No. 2012-163739, there is also disclosed a connector arranged with multiple connecting terminals in an end portion of the board.

As connectors different from the card edge connector, there are known connectors disclosed in WO2009/128413A1, WO2003/054608A1, and SNAP12 MSA Revision 1.1 May 15, 2002 (http://www.physik.unizh.ch/~avollhar/snap12msa_051502.pdf). With these connectors, by arranging the connecting terminals (for example, the connecting pins) two-dimensionally, the connecting terminals can be arranged in high density, and the connecting terminals are appropriate for high-speed signal transmission. Note that, as the connectors with the connecting terminals arranged two-dimensionally, there are known, for example, MEG-Array (registered trademark).

In the case of the card edge connectors disclosed in Japanese Patent Application Laid-open Publication No. 2013-134347 and No. 2012-163739, the attachable/detachable direction of the connectors and the insertable/removable direction of the optical module match. Thus, by inserting the optical module adopting the card edge connector in the cage, the connector can be connected as is.

In the case of the card edge connectors disclosed in Japanese Patent Application Laid-open Publication No. 2013-134347 and No. 2012-163739 however, the connecting terminals are arranged aligned in only a width direction of a board of the optical module, thus the connecting terminals cannot be arranged in high-density and are not suited for higher speed signal transmission. Further, in the case of the card edge connector, wiring between the connecting terminals of the main board-side connector (fixed-side connector) and the main board becomes long, thus in this regard it is also not suited for high-speed signal transmission. For higher speed signal transmission, it is advantageous to adopt a connector with connecting terminals arranged two-dimensionally on a plane in parallel with a board, as the connectors disclosed in WO2009/128413A1 and WO2003/054608A1 and SNAP12 MSA Revision 1.1 May 15, 2002 (http://www.physik.unizh.ch/~avollhar/snap12msa_051502.pdf).

As with the connectors disclosed in WO2009/128413A1 and WO2003/054608A1 and SNAP12 MSA Revision 1.1 May 15, 2002 (http://www.physik.unizh.ch/~avollhar/snap12msa_051502.pdf), in the case of the connector with the connecting terminals arranged two-dimensionally, the connecting terminals are aligned in a surface in parallel with the board (the board of the optical module or a main board), thus the direction in which the connector is to be attached/detached is a direction that intersects with the board (for example, a direction perpendicular to the board). On the contrary, the optical module that is insertable to and removable from the cage is inserted or removed substantially in parallel with the board (the board of the optical module or the main board). In other words, even if the connector with the connecting terminals arranged two-dimensionally is adopted as the optical module (an optical module that is insertable/removable with respect to the cage), the attaching/detaching direction of the connector (a direction that intersects a connector surface with the connecting terminals arranged two-dimensionally) and an inserting/removing direction of the optical module do not match. In this way, the optical modules disclosed in WO2009/128413A1, WO2003/054608A1, and SNAP12 MSA Revision 1.1 May 15, 2002 (http://www.physik.unizh.ch/~avollhar/snap12msa_051502.pdf) are fixed with respect to the board, and have not been considered at all regarding inserting/removing to/from with respect to the cage.

Note that, such a problem is not limited to the optical module, and is also a problem that exists in relation to other communication modules (communication terminals) such as an electric module.

SUMMARY

An advantage of some aspects of the present invention is to adopt a connector arranged with connecting terminals two-dimensionally to a cage that a communication module is insertable to and removable from or to a communication module that is insertable to and removable from the cage.

An aspect of the invention is a cage that a communication module having a module-side connector arranged two-dimensionally with connecting terminals is insertable to and removable from, the cage including:

a movable cage that is rotatable about a rotation axis, the movable cage having an insertion opening to which the communication module is inserted and a window provided in a position of the module-side connector during inserting of the communication module, the movable cage switching between a first position and a second position by rotating, in the first position, an insertion direction of the communication module to the movable cage being slanted, with respect to a board arranged with a fixed-side connector having connecting terminals arranged two-dimensionally, the communication module being insertable to and removable from the movable cage, in the case that the movable cage is made to be from the first position to the second position in a state where the communication module is inserted, the module-side connector and the fixed-side connector being connected through the window.

Another aspect of the invention is a communication module including:

a module-side connector having connecting terminals arranged two-dimensionally;

a board arranged with the module-side connector; and a housing having a window, the housing containing the board and exposing the module-side connector from the window, the housing being shaped as insertable from an insertion opening of a cage.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 3A is a view of the optical module 1 seen from obliquely above, and FIG. 3B is a view of the optical module 1 seen from obliquely below;

FIG. 7A is an explanatory view of the case where the movable cage 60 is in the first position, and FIG. 7B is an explanatory view of the case where the movable cage 60 is in the second position;

DESCRIPTION OF EXEMPLARY EMBODIMENTS

Figure 1A:
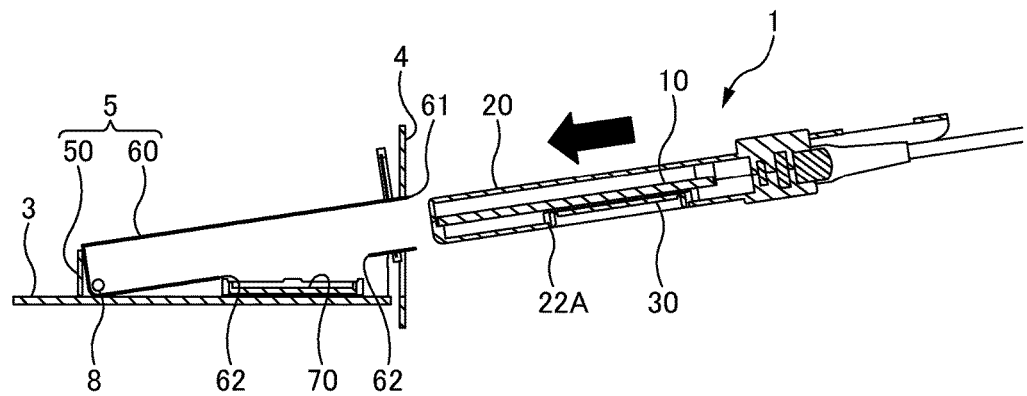
FIG. 1A to FIG. 1C are explanatory views of an overview of the present embodiment.

At least the following matters will become clear through the description of the present specification and the accompanying drawings to be described below.

A cage that a communication module having a module-side connector arranged two-dimensionally with connecting terminals is insertable to and removable from, the cage includes:

a movable cage that is rotatable about a rotation axis, the movable cage having an insertion opening to which the communication module is inserted and a window provided in a position of the module-side connector during inserting of the communication module, the movable cage switching between a first position and a second position by rotating, in the first position, an insertion direction of the communication module to the movable cage being slanted, with respect to a board arranged with a fixed-side connector having connecting terminals arranged two-dimensionally, the communication module being insertable to and removable from the movable cage, in the case that the movable cage is made to be from the first position to the second position in a state where the communication module is inserted, the module-side connector and the fixed-side connector being connected through the window.

In this way, the cage that the communication module is insertable to and removable from may adopt the connector arranged two-dimensionally with the connecting terminals.

The rotation axis of the movable cage is preferably arranged in an opposite side to the insertion opening. In this way, the force needed for attaching and removing the connector can be decreased.

The window of the movable cage is preferably arranged nearer to the insertion opening than the rotation axis. In this way, the angle of the movable cage in the first position can be made small.

It is preferable that a cage further includes a stopper fixed to the board, the movable cage having a slit, the stopper entering in the slit, in the case where the movable cage is made to be from the first position to the second position, the stopper that has entered in the slit inhibits insertion of the communication module from the insertion opening, in the case where the movable cage is in the second position in a state where the communication module has not been inserted. In this way, an irregular insertion of the communication module can be prevented.

It is preferable that in a state where the communication module has not been inserted normally in the movable cage, a housing of the communication module to an inner side of the slit contacts the stopper, and thus the movable cage is inhibited from rotating from the first position to the second position, and in a state where the communication module has been inserted normally in the movable cage, a groove portion formed in the housing is positioned to an inner side of the slit, the stopper enters in the slit and the groove portion, and thus the movable cage can be made to be from the first position to the second position. In this way, damage to the connector can be prevented.

It is preferable that the stopper is formed with a recess, the communication module is arranged with a claw portion in the groove portion, in the case where the movable cage is made to be in the second position while in a state where the communication module is inserted, the claw portion is entered in the recess, and the movable cage is fixed. In this way, the movable cage can be fixed.

It is preferable that in the case where the movable cage is made to be from the first position to the second position, the insertion opening moves within an opening portion of a front panel, and a shielding portion to block a gap in the opening portion in the case where the movable cage is in the second position is further included. In this way, leaking of electromagnetic noise can be suppressed.

It is preferable that the connecting terminals are configured with a plate-shaped pin, and a surface of the plate-shaped pin is in a direction perpendicular to the rotation axis. In this way, even if the connector surfaces are slanted with respect to each other during attaching and removing of the connectors, the connecting terminals are not easily damaged.

A communication device includes:

a fixed-side connector arranged on a board, the fixed-side connector being arranged two-dimensionally with connecting terminals; and a cage that a communication module having a module-side connector arranged two-dimensionally with connecting terminals is insertable to and removable from, the cage including a movable cage that is rotatable about a rotation axis, the movable cage having an insertion opening to which the communication module is inserted and a window provided in a position of the module-side connector during inserting of the communication module, the movable cage switching between a first position and a second position by rotating, in the first position, an insertion direction of the communication module to the movable cage being slanted, with respect to the board, the communication module being insertable to and removable from the movable cage, in the case that the movable cage is made to be from the first position to the second position in a state where the communication module is inserted, the module-side connector and the fixed-side connector being connected through the window.

In this way, the communication device that has the cage that the communication module is insertable to and removable from can adopt the connector arranged two-dimensionally with the connecting terminals.

A communication module includes:

a module-side connector;

a board arranged with the module-side connector; and a housing that contains the board and that is shaped as insertable from an insertion opening of a cage, the board being contained in the housing, in parallel with an insertion direction to the cage, the module-side connector having connecting terminals arranged two-dimensionally on a connector surface in parallel with the board, the housing having a window in parallel with the connector surface and exposing the module-side connector from the window.

In this way, the communication module that is insertable to and removable from the cage can adopt the connector arranged two-dimensionally with the connecting terminals.

It is preferable that the connecting terminals are configured with a plate-shaped pin, a surface of the plate-shaped pin is in a direction perpendicular to the connector surface, and is also in a direction in parallel with the insertion direction. In this way, even if the connector surfaces are slanted with respect to each other during attaching and removing of the connectors, the connecting terminals are not easily damaged.

A side surface of the housing is preferably formed with a groove portion in which a stopper provided to the cage side can enter. In this way, irregular insertion of the communication module can be prevented.

It is preferable to include a claw portion movable along the insertion direction, the claw portion being arranged protruding from the groove portion, wherein the claw portion contacts the stopper and thus moves, enters in a recess of the stopper that has entered in the groove portion, and fixes the communication module. In this way, the communication module can be fixed.

It is preferable that the claw portion is provided to a lever operated by an operator, by operating the lever, the claw portion that has entered in the recess can be disengaged. In this way, the fixed state of the communication module can be easily disengaged.

It is preferable that the board is sandwiched, from a direction perpendicular to a surface direction of the board, with a member configuring the housing, in the case that a force exceeding a friction force between the board and the housing is applied to the board, the board is movable in the surface direction with respect to the housing. In this way, damage to the connectors can be suppressed.

A connecting method to connect a connector by inserting a communication module in a cage, the method includes:

making a movable cage that is rotatable about a rotation axis to be in a first position in which an insertion direction of the communication module is slanted, with respect to a board arranged with a fixed-side connector having connecting terminals arranged two-dimensionally, inserting, from an insertion opening of the movable cage, a communication module having a module-side connector arranged two-dimensionally with connecting terminals, rotating the movable cage from the first position to a second position while in a state where the communication module is inserted, and connecting the module-side connector and the fixed-side connector.

In this way, the connector arranged two-dimensionally with the connecting terminals can be adopted for both the cage that the communication module is insertable to and removable from and the communication module that is insertable to and removable from the cage.

Embodiment 1

Overview

Figure 1B:
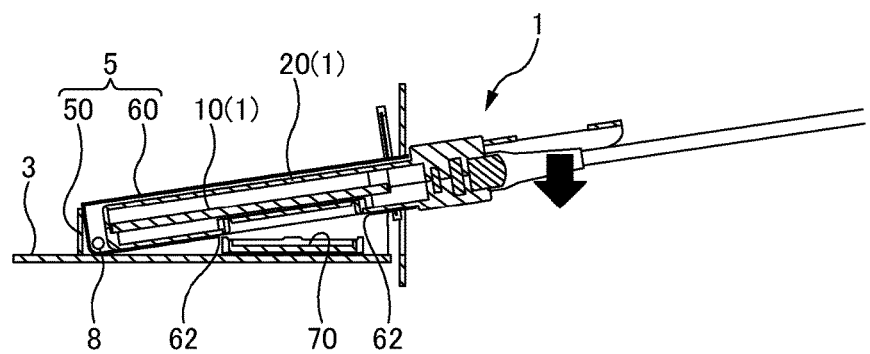
Figure 1C:
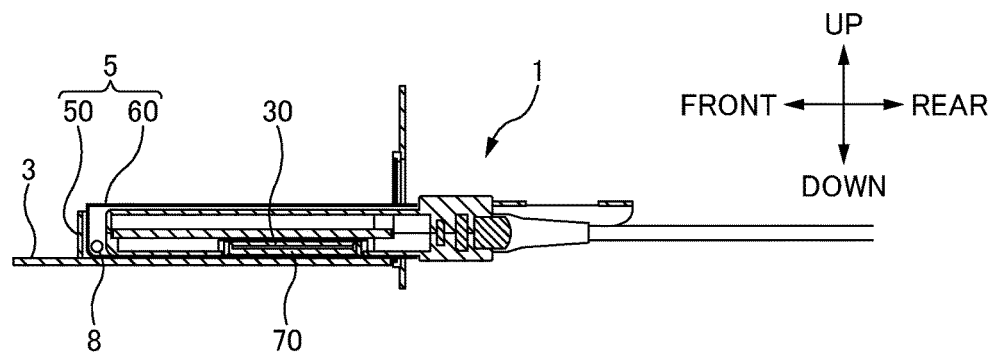

FIG. 1A to FIG. 1C are explanatory views of an overview of this embodiment.

On a board 10 of an optical module 1 is mounted a module-side connector 30. On a main board 3 is arranged a fixed-side connector 70. The module-side connector 30 and the fixed-side connector 70 are connectors arranged two-dimensionally with connecting terminals.

The main board 3 is arranged with a movable cage 60. The movable cage 60 has an insertion opening 61 and a window 62. The movable cage 60 rotates about a rotation axis 8, and thus switches between a first position (refer to FIG. 1A and FIG. 1B) and a second position (refer to FIG. 1C).

As shown in FIG. 1A, in the first position, the insertion direction of the optical module 1 to the movable cage 60 is slanted with respect to the main board 3, and the optical module 1 is insertable to and removable from the movable cage 60.

As shown in FIG. 1B, when the optical module 1 is inserted in the movable cage 60, the module-side connector 30 of the optical module 1 is positioned in the window 62 of the movable cage 60. Further, the module-side connector 30 of the optical module 1 is opposed slanted with respect to the fixed-side connector 70.

In the case that the movable cage 60 that is in a state inserted with the optical module 1 is made to be from the first position (refer to FIG. 1B) to the second position (refer to FIG. 1C), the module-side connector 30 and the fixed-side connector 70 are electrically connected through the window 62 (via the window 62).

As described above, in this embodiment, the optical module 1 that is insertable to and removable from the movable cage 60 adopts the connector arranged two-dimensionally with the connecting terminals.

In the below explanation, as shown in FIG. 1C, an up-down direction and a front-rear direction are defined. In other words, a direction perpendicular to the main board 3 is the "up-down direction", and the side provided with the fixed-side connector 70 seen from the main board 3 is referred to as "up" and the opposite side is referred to as "down". Further, the direction of optical fibers in the state where the module-side connector 30 and the fixed-side connector 70 are connected (a second state of the movable cage 60) is referred to as a "front-rear direction", and the side of the optical module 1 seen from the optical fibers is referred to as "front" and the opposite side is referred to as "rear". Note that, the direction perpendicular to the up-down direction and the front-rear direction (the direction perpendicular to a paper surface of FIG. 1C) is referred to as a "left-right direction", and the right side seen from the rear side is referred to as "right" and the opposite side is referred to as "left".

Note that, when explaining the optical module 1 independently, the optical module 1 is explained using each of the directions, according to the position of the optical module 1 in FIG. 1C.

<Module-Side Connector 30 and Fixed-Side Connector 70>

Figures 2A, 2B:
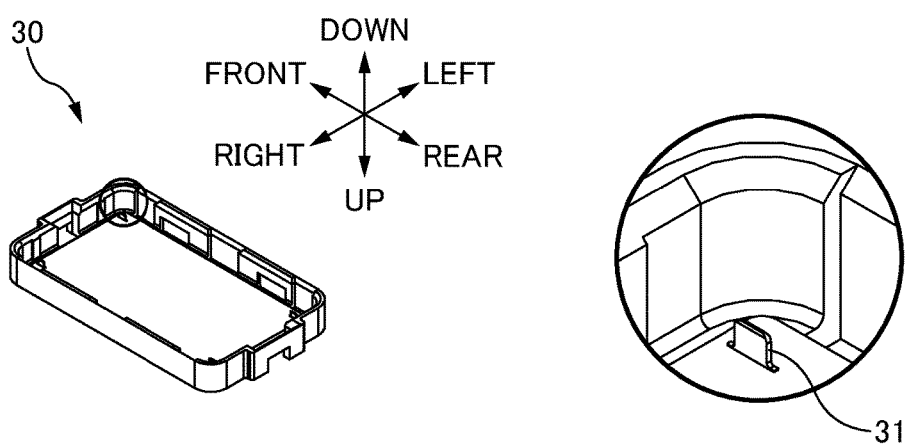
FIG. 2A is a perspective view of a module-side connector 30 seen from a connector-surface-side.
FIG. 2B is an enlarged view of a connecting terminal 31 of the module-side connector 30.
Figures 2C, 2D:
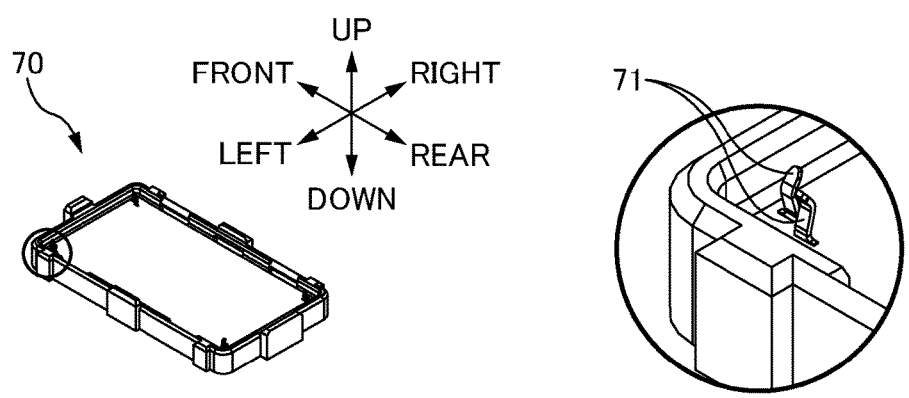
FIG. 2C is a perspective view of a fixed-side connector 70 seen from the connector-surface-side.
FIG. 2D is an enlarged view of a connecting terminal 71 of the fixed-side connector 70.

FIG. 2A is a perspective view of the module-side connector 30 seen from a connector-surface-side. FIG. 2B is an enlarged view of a connecting terminal 31 of the module-side connector 30. FIG. 2C is a perspective view of a fixed-side connector 70 seen from the connector-surface-side. FIG. 2D is an enlarged view of a connecting terminal 71 of the fixed-side connector 70.

The connector surface of the module-side connector 30 is arranged two-dimensionally with the connecting terminals 31. In other words, the connecting terminals 31 are arranged two dimensionally on a plane in parallel with the board 10 (refer to FIG. 1). A direction that intersects with the connector surface arranged two-dimensionally with the connecting terminals 31 is an attaching/detaching direction of the connector. In the drawing, only the connecting terminals 31 in four corners of the connector surface are shown, but the connector surface is arranged with, for example, 200 (10×20 connecting terminals) connecting terminals 31. As the module-side connector 30 (and the fixed-side connector 70), for example, MEG-Array (a registered trademark) can be adopted.

The connecting terminals 31 of the module-side connector 30 are configured with plate-shaped pins.

The connector surface of the fixed-side connector 70 is also arranged two-dimensionally with the connecting terminals 71. In other words, the connecting terminals 71 are arranged two-dimensionally on a plane that is in parallel with the main board 3 (refer to FIG. 1). A direction that intersects the connector surface arranged two-dimensionally with the connecting terminals 71 is the attaching/detaching direction of the connector. In the drawing, only the connecting terminals 71 in four corners of the connector surface are shown, but the same number of the connecting terminals 71 (for example, 200 connecting terminals) as the connecting terminals 31 of the module-side connector 30 are arranged.

The connecting terminal 71 of the fixed-side connector 70 is configured with a pair of spring-like pins. This pair of spring-like connecting terminals 71 sandwich both surfaces of the plate-shaped connecting terminals 31 of the module-side connector 30, and thus both terminals are electrically connected.

A force needed for attaching/detaching one terminal from each other is very small. In the case that multiple terminals are arranged in high density however, a force needed for attaching/detaching the connector becomes large. In the case where the connector is attached to and detached from the connector surface in the direction perpendicular to the connector surface, the multiple terminals are to be attached/detached at the same time, and thus the force needed to attach and detach the connector becomes large.

On the contrary, in this embodiment, the connector is attached/detached while rotating the movable cage 60 about the rotation axis 8 (refer to FIG. 1B and FIG. 1C). In this way, the multiple terminals are gradually attached/detached, thus the force needed for attaching/detaching the connector can be decreased. Note that, in this embodiment, the connector is attached/detached using the principle of leverage, and thus the force needed for attaching/detaching the connector can be decreased.

Further, in this embodiment, the connector is attached/detached while rotating the movable cage 60 about the rotation axis 8, thus the surfaces of the plate-shaped connecting terminals 31 of the module-side connector 30 are arranged to be perpendicular to an axial direction (left-right direction) of the rotation axis 8. In other words, the surface of the plate-shaped connecting terminal 31 of the module-side connector 30 is in parallel with the up-down direction (the direction perpendicular to the connector surface of the module-side connector 30) and the front-rear direction (the insertion direction of the optical module 1), and is perpendicular to the left-right direction. The surface of the plate-shaped connecting terminal 31 is placed in such an orientation, so that even when the connector surfaces incline with respect to each other during attaching/detaching of the connectors, the connecting terminals (the connecting terminals 31, the connecting terminals 71) are not easily damaged.

<Optical Module 1>

Figure 3A:
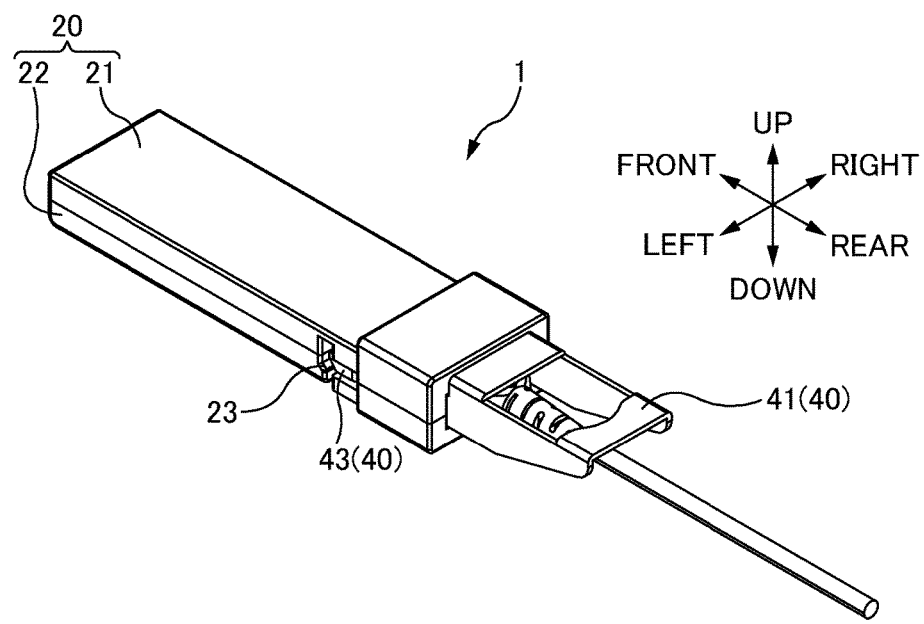
FIG. 3A and FIG. 3B are perspective views of an optical module 1.
Figure 3B:
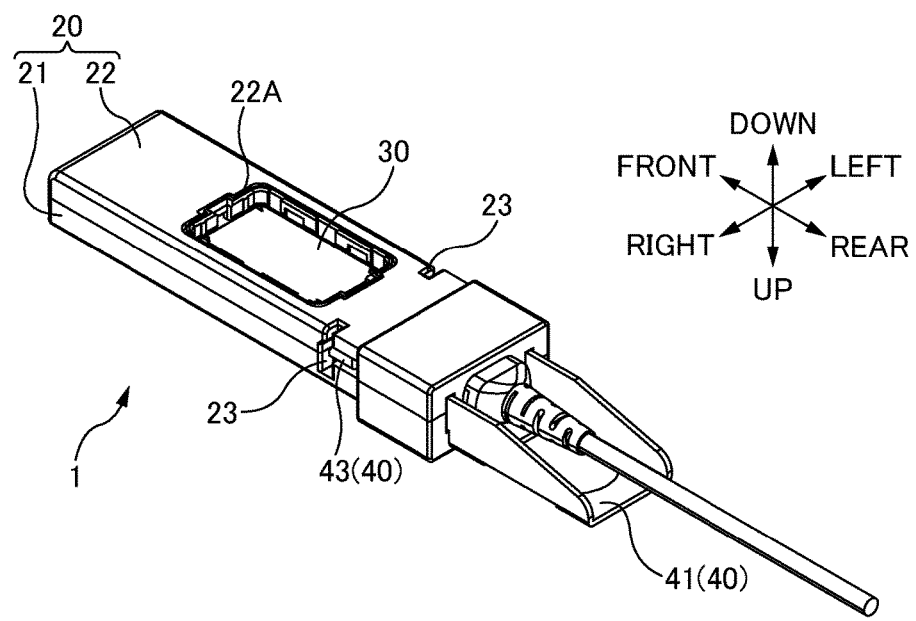
Figure 4:
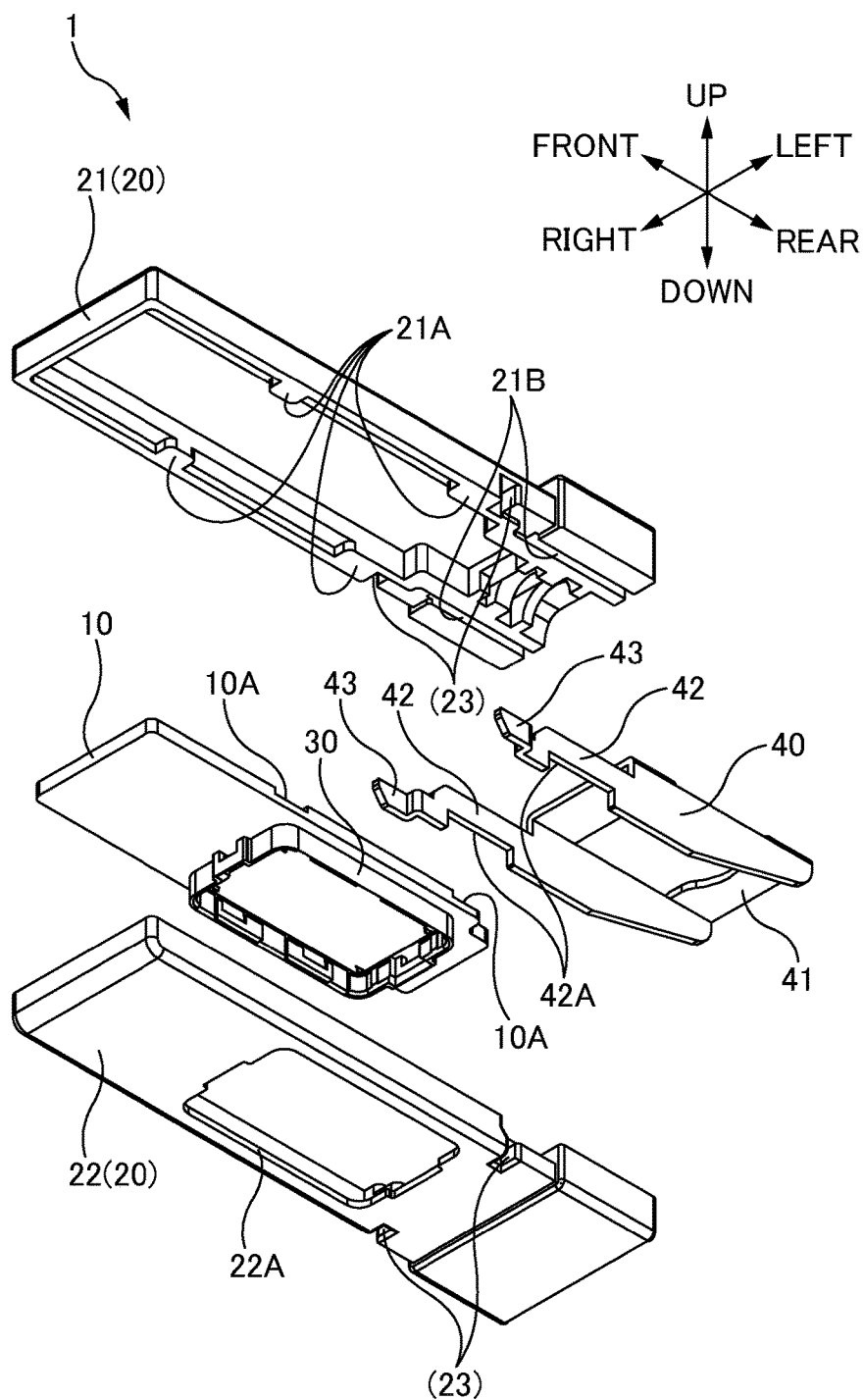
FIG. 4 is an exploded view of the optical module 1 seen from obliquely below.

FIG. 3A and FIG. 3B are perspective views of the optical module 1. FIG. 3A is a view of the optical module 1 seen from obliquely above. FIG. 3B is a view of the optical module 1 seen from obliquely below. FIG. 4 is an exploded view of the optical module 1 seen from obliquely below. Note that, in FIG. 4, the optical fibers and a boot that protects the optical fibers are omitted.

The optical module 1 is a communication terminal that is insertable to and removable from the cage, and converts optical signals transmitted and received with the optical fibers with electrical signals, and vice versa. The optical fibers extend out from a rear side of the optical module 1 (includes an optical fiber cord and an optical fiber cable).

The optical module 1 has the board 10, the housing 20, the module-side connector 30, and a lever 40 (refer to FIG. 4).

The board 10 is a printed circuit board mounted with such as a photoelectric conversion element (not shown) and an electric circuit (not shown). For example, as the photoelectric conversion element, a semiconductor laser as a light emitting element, and a photodiode as a light receiving element are mounted on the board 10. Further, as the electric circuit, a driver that drives a semiconductor laser, an amplifier that amplifies an output of a photo diode and the like are mounted on the board 10.

The board 10 is a rectangular shape, and the long side is in parallel with the front-rear direction. An undersurface of the board 10 is attached with the module-side connector 30 with the connector surface facing below. The lower surface of the board 10 and the module-side connector 30 are soldered together.

The housing 20 is a member that contains the board 10. The housing 20 is configured with an upper housing 21 and a lower housing 22. The lower housing 22 is formed with a window 22A (opening) (refer to FIG. 4), and the module-side connector 30 is exposed from the window 22A (refer to FIG. 3B).

The upper housing 21 and the lower housing 22 hold the board 10 by sandwiching the board 10 (sandwiches the board 10). The upper housing 21 is formed in four sections with protrusions 21A that protrude inwardly. An upper surface of the board 10 is formed with recesses 10A (a part of the board 10 with a thin thickness) in four sections, and the four recesses 10A are provided near a back surface in the four corners of the module-side connector 30. When the board 10 is contained in the housing 20, the protrusions 21A of the upper housing 21 are positioned in the recesses 10A of the board 10, and with the lower housing 22 sandwiches the board 10. The board 10 is fixed near four corners of the module-side connector 30, and thus it is difficult for the module-side connector 30 to move in the up-down direction within the board 10 during attaching/detaching of the connector.

The recesses 10A of the board 10 are formed large with respect to the protrusions 21A of the upper housing 21, and gaps are formed between the protrusions 21A and the recesses 10A in the surface direction of the board 10. With the gaps, in the case that a force exceeding a frictional force with the housing 20 is applied in the surface direction (the front-rear direction and the left-right direction: the direction perpendicular to the up-down direction) of the board 10, the board 10 can move in the surface direction with respect to the housing 20. In this way, in the case that an excess force (a force exceeding a frictional force with the housing 20) is added in the surface direction of the module-side connector 30, the board 10 can move in the surface direction with respect to the housing 20, and the soldered sections between the board 10 and the module-side connector 30 can be inhibited from breaking.

The left and right side surfaces of the housing 20 are formed with groove portions 23 along the up-down direction (refer to FIG. 3A and FIG. 3B). The groove portions 23 are provided in positions corresponding to the slits 63 of the movable cage 60. The function of the groove portions 23 will be described later.

The lever 40 is a component operated by an operator during inserting/removing of the optical module 1. When the optical module 1 is inserted in the movable cage 60, the lever 40 protrudes to the rear side from the insertion opening 61 of the movable cage 60, and the operator can operate the lever 40 with his/her finger. The lever 40 is attached movably in the front-rear direction in a predetermined range with respect to the housing 20, and receives a force from the housing 20 from the front direction at all times via a spring (not shown). When the operator pulls back the lever 40, the lever 40 moves slightly backwards, and when the operator lets go of the lever 40 the lever 40 returns to the original position.

The lever 40 has an operating portion 41, a pair of side surface plates 42, and a pair of claw portions 43.

The operating portion 41 is a rear side part of the lever 40, and is apart directly operated by the operator with his/her fingers.

The pair of side surface plates 42 is plate-shaped parts formed to extend forward from both the left and the right side surfaces of the operating portion 41. The side surface plates 42 are arranged in guide grooves 21B within the housing 20, and in this way the lever 40 is guided in the front-rear direction with respect to the housing 20. The side surface plates 42 are formed with recesses 42A to arrange a spring (not shown). The spring, in a compressed state, contacts the housing 20 in a rear end thereof and contacts the recesses 42A of the side surface plates 42 in a front end thereof. In this way, the lever 40 receives the force from the front direction from the housing 20.

A pair of claw portions 43 is each formed to the front side of each of the side surface plates 42. The claw portions 43 are arranged protruding from the groove portions 23 of the housing 20. The claw portions 43 are formed with a surface (tapered portion) facing obliquely downwards. The claw portions 43 configure a latch mechanism (lock mechanism) to fix the optical module 1 as will be described later.

<Configuration of Cage 5>

Figure 5A:
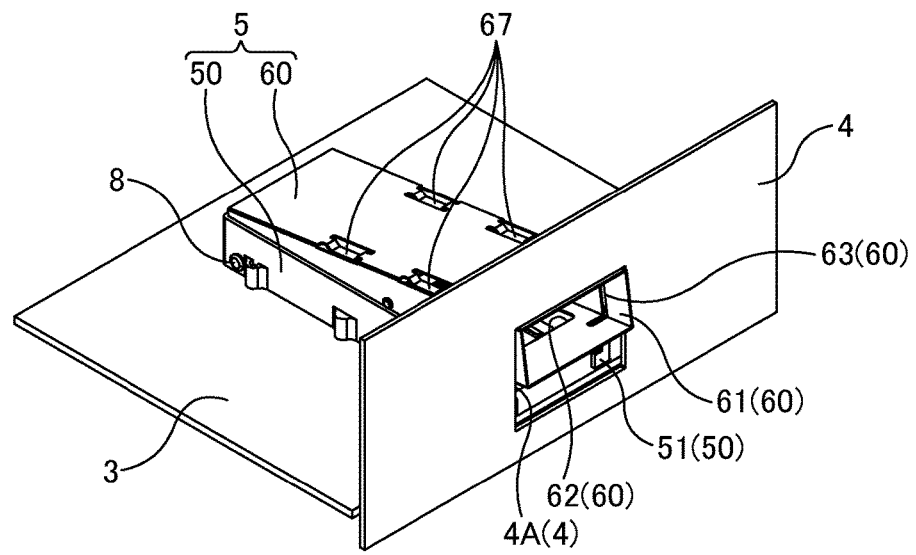
FIG. 5A and FIG. 5B are perspective views of a cage 5 in the case that a movable cage 60 is in a first position.
Figure 5B:
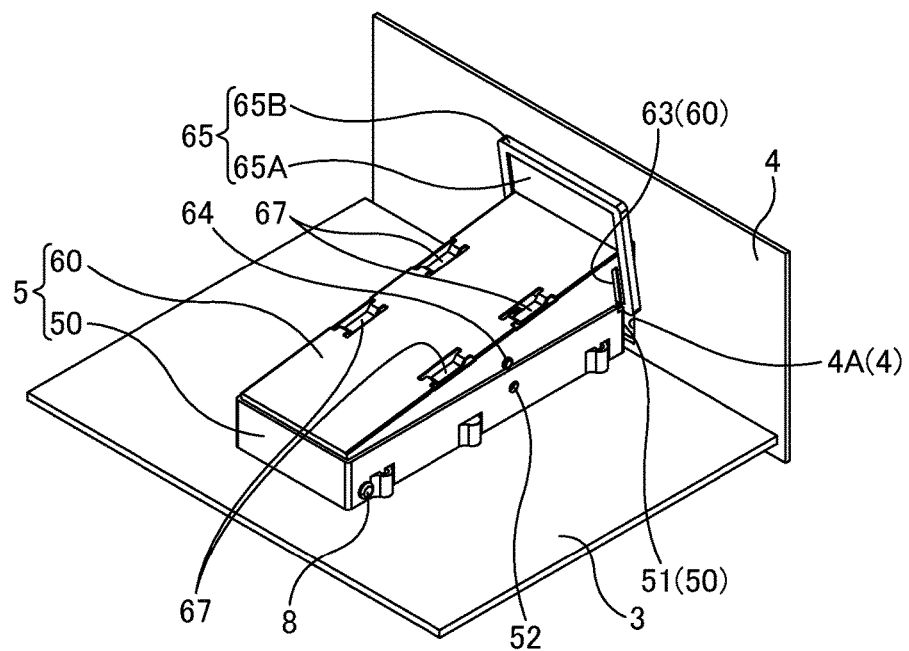
Figure 6A:
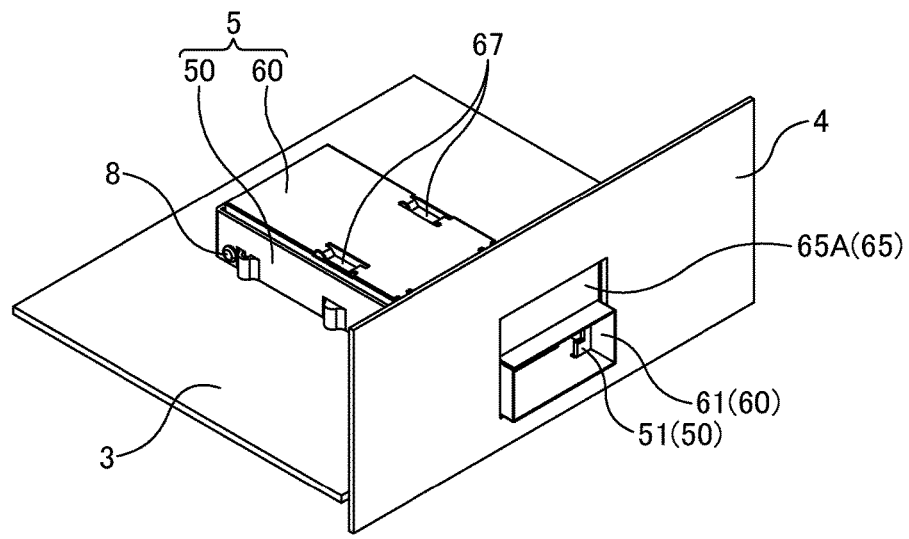
FIG. 6A and FIG. 6B are perspective views of the cage 5 in the case that the movable cage 60 is in a second position.
Figure 6B:
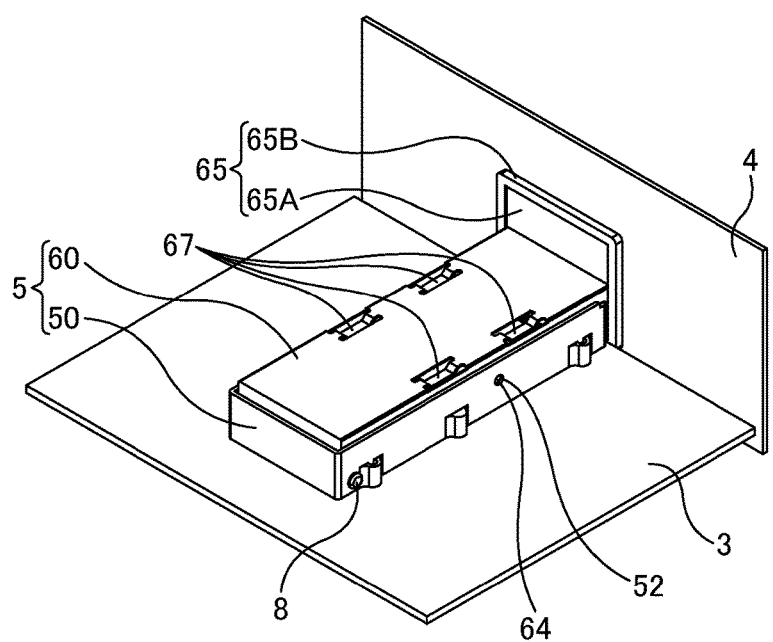
Figure 7A:
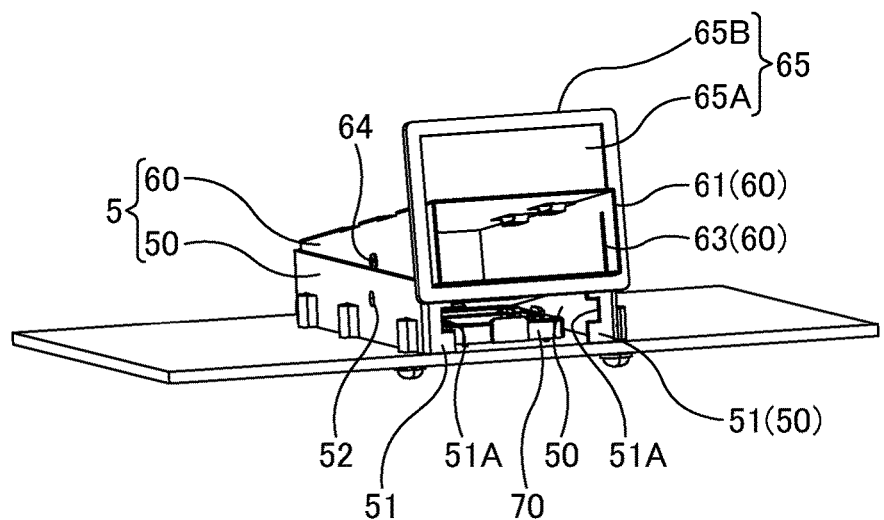
FIG. 7A and FIG. 7B are explanatory views of a state where a front panel 4 has been removed.
Figure 7B:
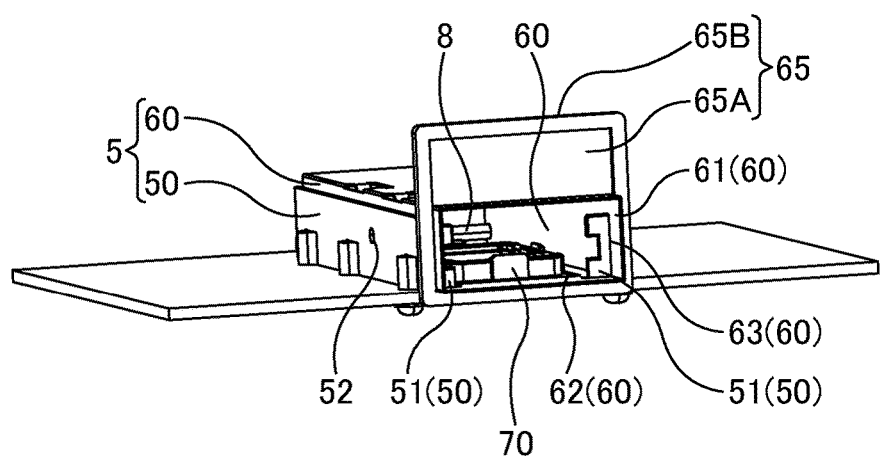

FIG. 5A and FIG. 5B are perspective views of a cage 5 when the movable cage 60 is in the first position. FIG. 6A and FIG. 6B are perspective views of the cage 5 when the movable cage 60 is in the second position. FIG. 7A and FIG. 7B are explanatory views of the state where a front panel 4 has been removed. FIG. 7A is the explanatory view of the case where the movable cage 60 is in the first position, and FIG. 7B is the explanatory view of the case where the movable cage 60 is in the second position.

The cage 5 is installed on the main board 3, and is a component that contains the optical module 1 in an insertable and removable manner. The main board 3 is, for example, a mother board to the communication device side (host side). The rear side (operator side) of the main board 3 is provided with the front panel 4. The front panel 4 is formed with an opening 4A, and the insertion opening 61 of the movable cage 60 is arranged in this opening 4A.

The cage 5 has a fixed cage 50, the movable cage 60, and the rotation axis 8.

The fixed cage 50 is fixed to the main board 3, and is a component that rotatably supports the movable cage 60. As shown in FIG. 7A and FIG. 7B, inside the fixed cage 50 is arranged the fixed-side connector 70. The fixed-side connector 70 is soldered on the main board 3. The fixed cage 50 functions also as a supporting member that supports the rotation axis 8. The fixed cage 50 rotatably supports the movable cage 60, via the rotation axis 8.

As shown in FIG. 7A and FIG. 7B, the rear end (the front panel 4 side) of the fixed cage 50 is formed with a pair of stoppers 51. The stoppers 51 are plate shaped parts, and protrude inwardly from each of the left and the right side surfaces of the fixed cage 50. The stoppers 51 are formed with recesses 51A. These recesses 51A configure a latch mechanism (lock mechanism) together with the claw portions 43 of the lever 40 of the optical module 1, as will be described later.

The movable cage 60 is a component that contains the optical module 1 in an insertable and removable manner and is rotatable about the rotation axis 8. The movable cage 60 is a box-shaped member that is a sectional rectangle long in the front-back direction. By a bending process of the metal plate into a rectangular shape in section, the containing portion to contain the optical module 1 is formed within the movable cage 60.

The movable cage 60 includes the insertion opening 61 and the window 62. The insertion opening 61 is an opening to insert the optical module 1, and is provided to the rear end of the movable cage 60. The window 62 is an opening provided to the lower surface (a surface to the main-board 3-side) of the movable cage 60, and is provided in the position of the module-side connector 30 at the time of inserting the optical module 1. In the case that the movable cage 60 is in the first position, the window 62 is opposed to the fixed-side connector 70 (refer to FIG. 1A), and in the case that the movable cage 60 is in the second position, the fixed-side connector 70 enters in the window 62 (refer to FIG. 1C, and FIG. 7B).

The movable cage 60 switches between the first position (refer to FIG. 1A, FIG. 1B, FIG. 5A and FIG. 5B) and the second position (refer to FIG. 1C, FIG. 6A, and FIG. 6B) by rotating about the rotation axis 8. In the first position, the insertion direction of the optical module 1 to the movable cage 60 is slanted with respect to the main board 3, and the optical module 1 can be inserted or removed.

To make the module-side connector 30 and the fixed-side connector 70 so as to not contact each other during insertion of the optical module 1 in the movable cage 60, in the case that the movable cage 60 is in the first position, the window 62 of the movable cage 60 needs to be positioned further to the upper side than the fixed-side connector 70. In this embodiment, the window 62 of the movable cage 60 is arranged near the insertion opening 61 than the rotation axis 8, thus even if the angle between the movable cage 60 and the main board 3 is small, the window 62 of the movable cage 60 can be positioned further to the upper side than the fixed-side connector 70.

Both side surfaces and the lower surface of the movable cage 60 are formed with slits 63. In the case that the movable cage 60 is made to be from the first position (refer to FIG. 1A and FIG. 1B) to the second position (refer to FIG. 1C), the stoppers 51 of the fixed cage 50 enter in the slits 63 of the movable cage 60 (refer to FIG. 7B). As shown in FIG. 7B, in the case that the movable cage 60 is in the second position in the state that the optical module 1 has not been inserted, the stoppers 51 that have entered in the slits 63 protrude to the inner side of the movable cage 60, and block insertion of the optical module 1 from the insertion opening 61. In this way, the housing 20 of the optical module 1 can be prevented from hitting against the module-side connector 30, and the soldered sections between the module-side connector 30 and the main board 3 can be prevented from being damaged.

In the case that the optical module 1 is normally inserted in the movable cage 60, the groove portions 23 of the housing 20 are positioned to the inner side of the slits 63. In other words, the slits 63 of the movable cage 60 are formed in positions corresponding to the groove portions 23 of the optical module 1.

Protrusions 64 are formed on the both side surfaces of the movable cage 60. These protrusions 64 are used for switching the movable cage 60 to the first position or the second position. In other words, the movable cage 60 stabilizes in the first position by the protrusions 64 contacting upper edges of the fixed cage 50. On the other hand, the movable cage 60 stabilizes in the second position by the protrusions 64 fitting in holes 52 in the side surfaces of the fixed cage 50.

The insertion opening 61 of the movable cage 60 protrudes to the rear side from the front panel 4. Thus, the opening portion 4A of the front panel 4 is formed widely in the up-down direction than the insertion opening 61, so that the insertion opening 61 can move up and down. As a result, a gap is formed between the opening portion 4A of the front panel 4 and the insertion opening 61 of the movable cage 60.

Supposing that there is a gap between the insertion opening 61 of the movable cage 60 and the opening portion 4A of the front panel 4, there is a possibility that electromagnetic noise may leak to the outside at the time of signal transmission. As a measure against this, a shielding portion 65 that shields electromagnetic noise is formed in the periphery of the movable cage 60 near the back surface of the front panel 4 (refer to FIG. 5B and FIG. 6B).

The shielding portion 65 is configured of a shielding plate 65A and a shielding seal 65B. The shielding plate 65A is attached to an upper surface of the movable cage 60, and is a metallic plate shaped member that blocks an upper portion of the opening portion 4A of the front panel 4. The shielding seal 65B is a member that blocks the gap between the shielding plate 65A and the movable cage 60 with the opening portion 4A, and for example is a member configured of a conductive rubber.

The upper surface of the movable cage 60 is formed with spring portions 67. The spring portions 67 have a function to press down the optical module 1 inserted in the movable cage 60 from the upper surface towards the window 62. In this way, in the case that the module-side connector 30 is to be connected to the fixed-side connector 70, the optical module 1 can be inhibited from floating inside the movable cage 60. Note that, with the spring portions 67 of the movable cage 60 pressing down the optical module 1, the housing 20 of the optical module 1 and the movable cage 60 come into contact with each other, and thus noise resistance improves.

The rotation axis 8 is an axis that rotatably supports the movable cage 60. The rotation axis 8 is supported by the fixed-side cage 50 here.

In this embodiment, the rotation axis 8 is arranged in an opposite side (a front side of the movable cage 60) to the insertion opening 61 of the movable cage 60. Thus, a distance between the position of the lever 40 of the optical module 1 (in the position near the insertion opening 61) and the rotation axis 8 widens, and the window 62 of the movable cage 60 (the attaching/detaching position of the connector) is positioned in between the rotation axis 8 and the insertion opening 61, thus by using the principle of leverage, the force needed to attach/detach the connector can be decreased.

<Movement During Attaching of the Optical Module 1>

In the case of mounting the optical module 1, as shown in FIG. 1A, the operator places the movable 60 in the first position in advance. It should be noted that, supposing that the movable cage 60 is in the second position, as shown in FIG. 6A, the stoppers 51 that have entered in the slits 63 protrude to the inner side of the movable cage 60, thus the operator cannot insert the optical module 1 from the insertion opening 61.

The operator inserts the optical module 1 in the movable cage 60 that is in the first position. In the case that the movable cage 60 is in the first position, the window 62 of the movable cage 60 is positioned further to the upper side than the fixed side connector 70, thus the module-side connector 30 and the fixed-side connector 70 do not come into contact during inserting of the optical module 1 in the movable cage 60.

Figure 8A:
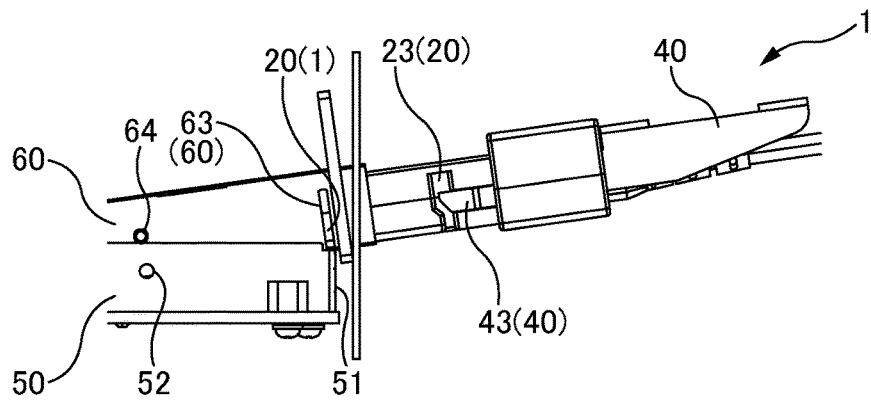
FIG. 8A is an explanatory view of near a slit 63 while in a state where the optical module 1 has not been sufficiently inserted.

FIG. 8A is an explanatory view near the slit 63 in the state where the optical module 1 has not been sufficiently inserted. In this state, supposing that the operator presses down the lever 40 of the optical module 1, the housing 20 of the optical module 1 to the inner sides of the slits 63 contacts the stoppers 51, thus the movable cage 60 is inhibited from rotating from the first position to the second position. In this way, damage to the fixed-side connector 70 can be prevented.

Figure 8B:
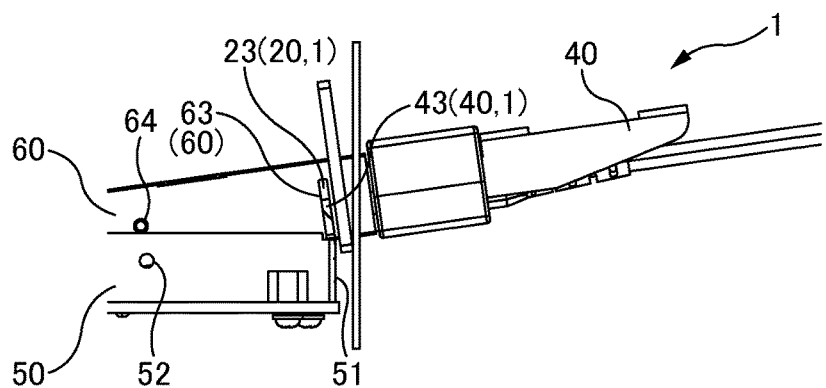
FIG. 8B is an explanatory view of near the slit 63 while in a state where the optical module 1 has been normally inserted.

FIG. 8B is an explanatory view near the slit 63 in the state where the optical module 1 has been normally inserted. In this state, the groove portions 23 of the housing 20 are positioned in the inner sides of the slits 63. Thus, in the case the operator presses down the lever 40 of the optical module 1, the stoppers 51 can enter in the slits 63 and the groove portions 23, and the movable cage 60 can rotatably move from the first position to the second position.

After the optical module 1 has been inserted normally in the movable cage 60, the operator presses down the lever 40 of the optical module 1. In this way, the optical module 1 and the movable cage 60 rotate about the rotation axis 8 from the first position towards the second position.

Figure 8C:
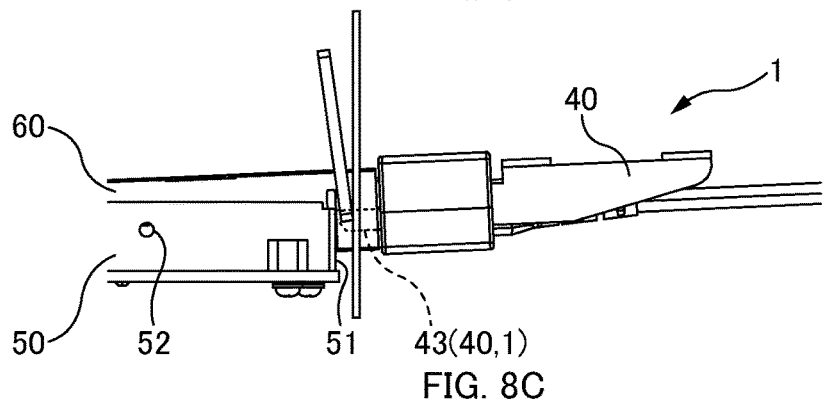
FIG. 8C is an explanatory view of near the slit 63 in the case where the movable cage 60 is during rotation from the first position to the second position.

FIG. 8C is an explanatory view of near the slit 63 while the movable cage 60 is rotating from the first position to the second position. Since the claw portions 43 of the optical module 1 are protruding from the groove portions 23 of the housing 20, while the movable cage 60 rotates from the first position to the second position, the claw portions 43 and the stoppers 51 come into contact with each other. The claw portion 43 is formed with a surface facing obliquely downwards (a tapered portion). This surface comes into contact with the stoppers 51, thus the claw portions 43 (lever 40) move backwards, and further the stoppers 51 can enter in the slits 63 and the groove portions 23, and the movable cage 60 can rotate to the second position.

Figure 8D:
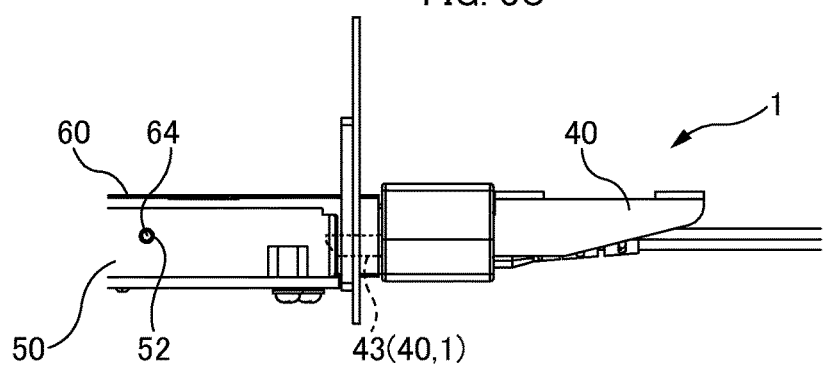
FIG. 8D is an explanatory view of near the slit 63 in the case where the movable cage 60 in the second position.

FIG. 8D is an explanatory view of near the slit 63 in the case that the movable cage 60 is in the second position. The stoppers 51 are each formed with the recess 51A (refer to FIG. 7A and FIG. 7B), and in the case that the movable cage 60 is in the second position, the claw portion 43 that has moved backwards moves forward with the force of the spring, and the claw portion 43 enters in the recess 51A. In this way, the optical module 1 is fixed to the fixed cage 50, and the movable cage 60 cannot rotate in a direction that returns to the first position, and the connector is prevented from disengaging. In this manner, a latch mechanism (lock mechanism) to fix the optical module 1 is configured with the claw portions 43 of the optical module 1 and the recesses 51A of the stoppers 51 of the fixed cage 50.

In the case that the operator makes the movable cage 60 that is in the state inserted with the optical module 1 to be from the first position to the second position, the module-side connector 30 and the fixed-side connector 70 are connected via the window 62 (through the window 62) of the movable cage 60. The movement of the movable cage 60 at this time is a rotational movement about the rotation axis 8, thus mounting of the connectors to each other is started in the state where the connector surface of the module-side connector is inclined with respect to the connector surface of the fixed-side connector 70. Thus, the multiple terminals are not connected at the same time and are gradually connected. In this way, even in the case where multiple terminals are arranged in a high density on the connector surface, the force needed to connect the connectors can be small.

Further, in this embodiment, connection of the connectors (point of action) is between the lever 40 (a point where a force is applied) and the rotation axis 8 (a fulcrum) of the movable cage 60, thus with the principle of leverage, the force of the operator to press down the lever 40 can be small.

In the case that the movable cage 60 is in the second position, as shown in FIG. 5B and FIG. 6B, the shielding portion 65 of the movable cage 60 blocks the opening portion 4A of the front panel 4. Specifically, the shielding plate 65A blocks an upper portion of the opening portion 4A of the front panel 4, and the shielding seal 65B blocks the gap between the shielding plate 65A and the opening portion 4A of the movable cage 60. The upper portion of the opening portion 4A blocked by the shielding plate 65A is the position where the insertion opening 61 was in the case that the movable cage 60 was in the first position. In this way, even if communication is started after mounting the optical module 1, the electromagnetic noise is less prone to leak from the opening portion 4A of the front panel 4.

<Movement During Removing of the Optical Module 1>

Figure 9A:
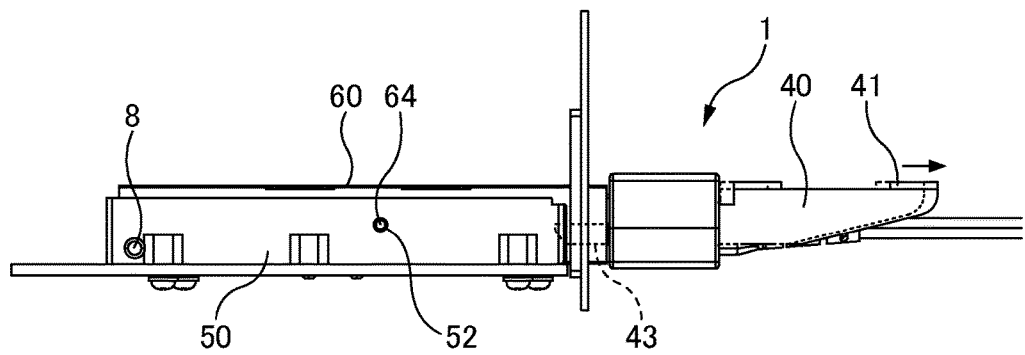
FIG. 9A to FIG. 9C are explanatory views of during removing of the optical module 1.
Figure 9B:
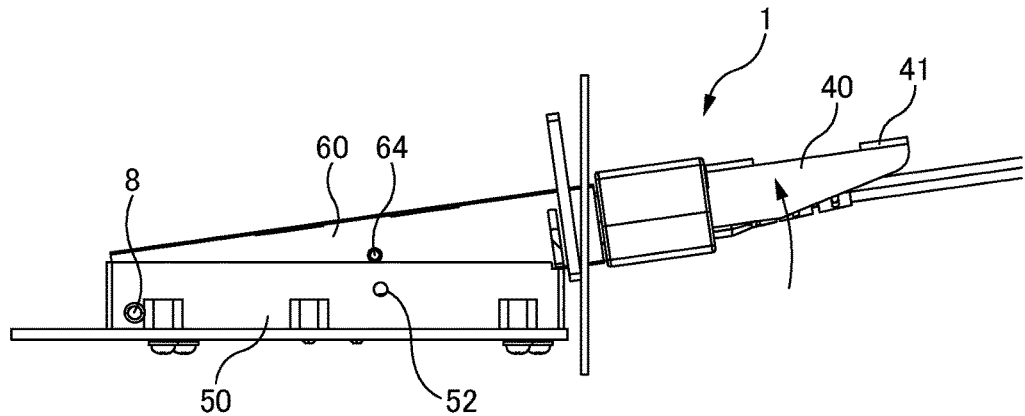
Figure 9C:
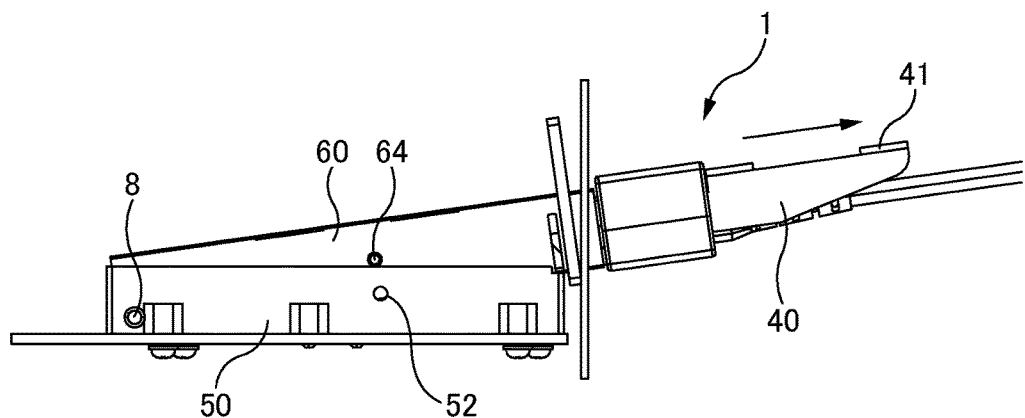

FIG. 9A to FIG. 9C are explanatory views during removing of the optical module 1.

First, as shown in FIG. 9A, the operator pulls back the lever 40 of the optical module 1. In this way, the lever 40 moves slightly backwards, and the claw portions 43 disengage from the recesses 51A (refer to FIG. 7A and FIG. 7B). In this way, the latched state of the latching mechanism (lock mechanism) is released, and the optical module 1 and the movable cage 60 can rotatably move from the second position to the first position.

It should be noted that, in the case that the operator operates the lever 40, there are cases where an excessive force is applied in a surface direction of the board 10 and the main board 3 via the lever 40. The recess 10A of the board 10 shown in FIG. 4 is formed large with respect to the protrusions 21A of the upper housing 21 however, and since the board 10 is sandwiched by the housing 20 in the state where the board 10 is in a movable state in the surface direction with respect to the housing 20, damage of the soldered section between the board 10 and the module-side connectors 30 can be inhibited, and damage of the soldered section between the main board 3 and the fixed-side connector 70 can be inhibited.

Next, as shown in FIG. 9B, the operator pulls up the lever 40 of the optical module 1. In this way, the optical module 1 and the movable cage 60 rotate about the rotation axis 8 and are made to be from the second position to the first position. It should be noted that, in the case where the operator stops pulling back the lever 40, the lever 40 returns to its original position, with the force of the spring (not shown: a spring that pushes the lever 40 forward and that is arranged in the recesses 42A in FIG. 4.)

In the case that the operator makes the movable cage 60 to be from the first position to the second position, the module-side connector 30 and the fixed-side connector 70 are disengaged. The movement of the movable cage 60 at this time is a rotational movement about the rotation axis 8, thus the connectors are disengaged from each other so that the connector surface of the module-side connector 30 is inclined with respect to the connector surface of the fixed-side connector 70. Thus, the multiple terminals are not disengaged at the same time, but are disengaged gradually.

In this way, even if the multiple terminals are arranged in high density on the connector surface, the force needed to disengage the connectors may be small.

Further, in this embodiment, the connectors (the point of action) are disengaged between the lever 40 (the point of the lever where the force is applied) and the rotation axis 8 (fulcrum) of the movable cage 60, thus with the principle of leverage the force for the operator to pull up the lever 40 may be small.

It should be noted that, as shown in FIG. 5B and FIG. 6B, both side surfaces of the movable cage 60 are formed with the protrusions 64, thus the movable cage 60 stabilizes in the first position or the second position, but does not stabilize in positions other than the first position and the second position. Thus, in the case that the operator pulls up the lever 40 from the state where the movable cage 60 is in the second position and rotates the movable cage 60, the movable cage 60 naturally goes to the first position, thus it does not fit in an intermediate position between the first position and the second position. Thus, the configuration is such that the optical module 1 is difficult to pull out before the movable cage 60 moves to the first position.

Further, in the case that the movable cage 60 is in the intermediate position between the first position and the second position, similar to the state shown in FIG. 8C, the stoppers 51 of the fixed cage 50 have entered in the groove portions 23 of the housing 20 of the optical module 1. Thus, the optical module 1 is prevented with the stoppers 51 from being pulled out before the movable cage 60 is made to be in the first position.

Finally, as shown in FIG. 9C, after the operator pulls up the optical module 1 and the movable cage 60 to the first position, the operator pulls out the optical module 1 from the movable cage 60. In the case that the movable cage 60 is in the first position, the window 62 of the movable cage 60 is positioned further to the upper side than the fixed-side connector 70, thus the module-side connector 30 and the fixed-side connector 70 do not come into contact during pulling out of the optical module 1 from the movable cage 60.

First Modified Example

Figure 10:
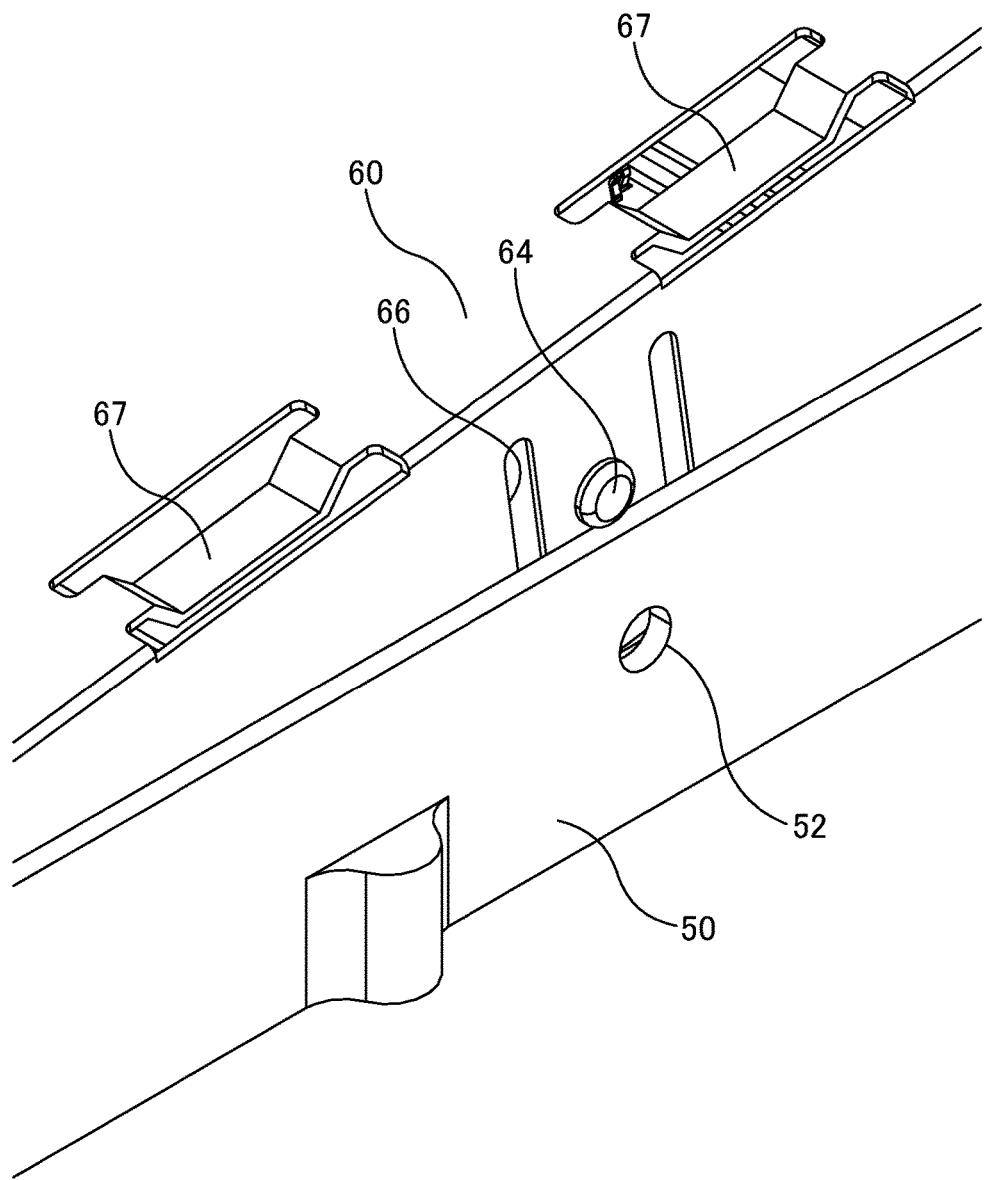
FIG. 10 is an explanatory view of a first modified example of a peripheral configuration of a protrusion 64 of the movable cage 60.

FIG. 10 is an explanatory view of a first modified example of a peripheral configuration of the protrusion 64 of the movable cage 60. In the first modified example, a pair of slit portions 66 is formed in the side surface of the movable cage 60, and the protrusion 64 is formed in a region sandwiched with this pair of the slit portions 66. The region sandwiched with the pair of the slit portions 66 has a function like a leaf spring, and deforms easily. Thus, movement of the movable cage 60 becomes smooth.

Second Modified Example

Figure 11:
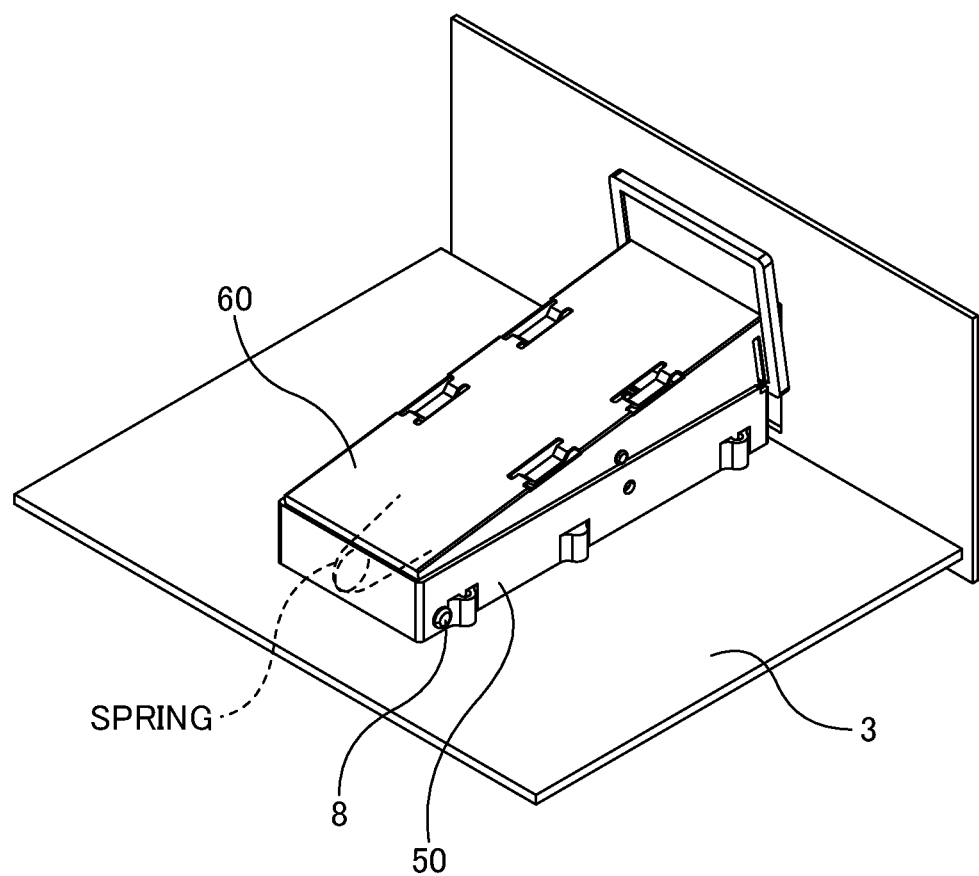
FIG. 11 is an explanatory view of a second modified example.

FIG. 11 is an explanatory view of a second modified example. In the second modified example, a spring is arranged near the rotation axis 8 of the movable cage 60, and the spring continues to apply a force to the movable cage 60 in a direction that the movable cage 60 heads to from the second position to the first position. In this way, in the state that the optical module 1 has not been inserted, due to a top surface of the movable cage 60 not contacting an upper edge of the opening portion 4A of the front panel 4, the movable cage 60 stabilizes in the first position. On the other hand, in the case where the operator inserts the optical module 1 in the movable cage 60, presses down the optical module 1 (and the movable cage 60) against the force of the spring, and the claw portions 43 of the optical module 1 enter in the recesses 51A of the fixed cage 50, the movable cage 60 stabilizes in the second position.

Note that, in FIG. 11, a torsion spring is described, but a leaf spring may be used instead of the torsion spring. Alternatively, means other than a spring may be used to continue applying the force to the movable cage 60 in the direction that the movable cage 60 heads from the second position to the first position.

In the second modified example, the protrusions 64 of the movable cage 60 and the holes 52 of the fixed cage 50 become unnecessary.

Second Embodiment

In the above described first embodiment, the fixed cage 50 is provided. The fixed cage 50 to contain the movable cage 60 however, does not have to be provided.

Figure 12:
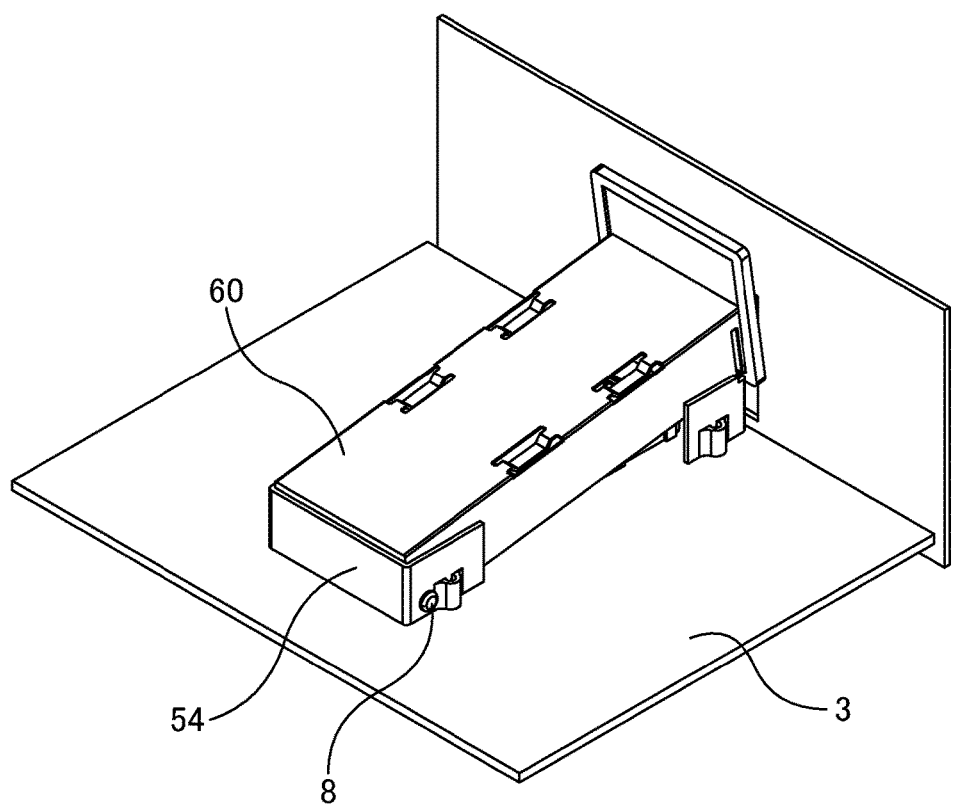
FIG. 12 is an explanatory view of a second embodiment.

FIG. 12 is an explanatory view of a second embodiment. In the second embodiment, a support member 54 on the main board 3 supports the rotation axis 8, and the movable cage 60 is supported rotatably. Thus, in the second embodiment, attaching/detaching of the connector is possible.

Further, also in the second embodiment, on the main board 3 is fixed the stoppers 51 having the recesses 51A. Thus, also in the second embodiment, by inserting the claw portions 43 of the optical module 1 in the recesses 51A, the optical module 1 can be fixed. Further, also in the second embodiment, with the stoppers 51, irregular insertion of the optical module 1 can be prevented.

Third Embodiment

In the above described first embodiment, the rotation axis 8 of the movable cage 60 is arranged in an opposite side to the insertion opening 61 (to a front side of the movable cage 60). The position of the rotation axis 8 however, is not limited to this position.

Figure 13:
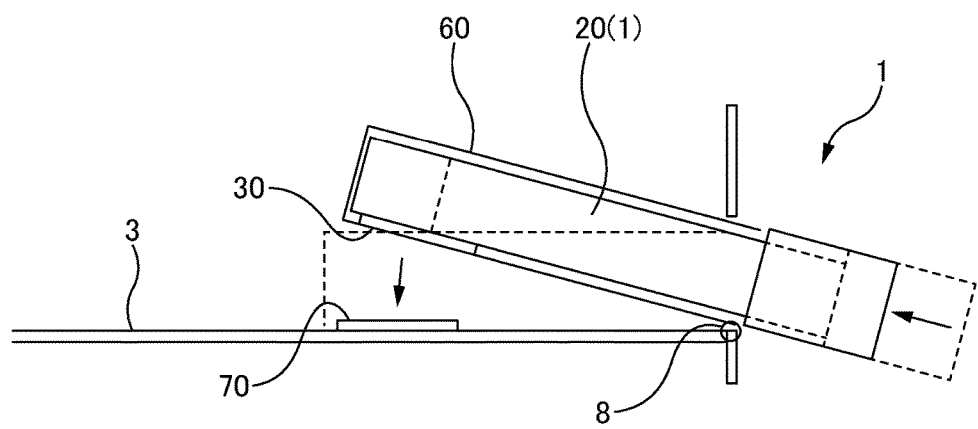
FIG. 13 is an explanatory view of a third embodiment.
Figure 14:
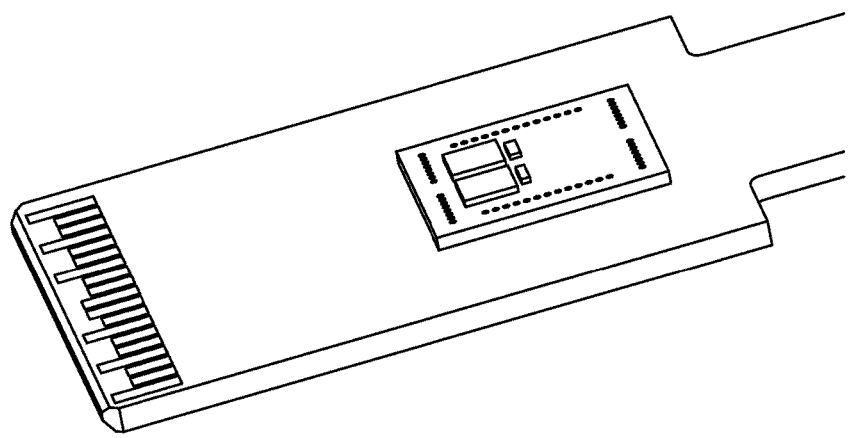
FIG. 14 is an explanatory view of a card edge connector which is a comparative example.

FIG. 13 is an explanatory view of a third embodiment. In the third embodiment, the rotation axis 8 is arranged to the rear side of the movable cage 60. Even with this arrangement, attaching/detaching of the connector is possible. Since the distance between the rotation axis 8 (fulcrum) and the position of the lever 40 (the point of the lever where the force is applied) is near however, compared to the first embodiment, a force is necessary to attach/detach the connector.

Other Points

The above embodiments are to facilitate understanding of this invention, and should not be interpreted to limit the invention in any way. This invention may be modified and improved without departing from its spirit thereof, and it is needless to say that this invention includes its equivalents.
<Regarding Optical Module 1>

In the above described embodiments, the communication module that is inserted to and removed from the cage is the optical module 1 that performs optical communication using optical fibers. The communication module inserted to and removed from the cage is not limited to the optical module 1 however, and may be an electric module that performs telecommunication. In the case that the communication module that is inserted/removed in/from the cage is an electric module, for example, it is possible to incorporate an active circuit (such as an equalizer, a wave-shaping/compensating circuit, preemphasis) in an internal board, and to communicate signals most appropriately adjusted to the property of a metal cable.

<Regarding Connecting Terminals 31, 71>

In the above described embodiments, the connecting terminals 31 of the module-side connector 30 are the plate-like pins, and the connecting terminals 71 of the fixed-side connector 70 are pairs of the spring-like pins. The configuration of the pins may be reversed however, and the connecting terminals 31 may be pairs of the spring-like pins and the connecting terminals 71 may be the plate-like pins. In this case, the surfaces of the plate-like pins of the fixed-side connector 70 are preferably in a direction perpendicular to the rotation axis 8. In this way, even if both of the connector surfaces are inclined during attaching/detaching of the connectors, the connecting terminals are not easily damaged.

It should be noted that, since the connecting terminals 31 of the module-side connector 30 are exposed to the outside and have a high possibility of being touched by the operator's hands, the connecting terminals 31 are preferably plate-like pins that have a higher strength than spring-like pins.

Further, in the above-described embodiments, the pair of the spring connecting terminals 71 sandwich both surfaces of the plate-like connecting terminal 31 of the module-side connector 30, thus both terminals are electrically connected. The shape of both terminals however, is not limited to the above. For example, one of the connecting terminals may be configured as a stick-like connecting pin and the other connecting terminal may be configured as a connecting hole, and the connecting pin may be inserted in the connecting hole to electrically connect both terminals.

<Regarding Latch Mechanism>

In the above described embodiments, with the latch mechanism (the claw portions 43 of the lever 40 of the optical module 1, the recesses 51A of the stoppers 51 of the fixed cage 50), the optical module 1 and the movable cage 60 are fixed in the second position. A different method/mechanism may be used however, to fix the optical module 1 and the movable cage 60 in the second position. For example, by fitting the protrusions 64 of the movable cage 60 in the holes 52 of the fixed cage 50, the optical module 1 and the movable cage 60 may be fixed in the second position. In this case however, a force is necessary when the movable cage 60 is moved between the first position and the second position.

<Regarding Groove Portions 23, Stoppers 51, and Slits 63>

In the above described embodiments, with the groove portions 23 of the optical module 1, the stoppers 51 of the fixed caged 50 and the slits 63 of the movable cage 60, irregular insertion of the optical module 1 was prevented. The groove portions 23, the stoppers 51, and the slits 63 however may be omitted. In this case, the irregular insertion of the optical module 1 cannot be prevented, but the shape of the optical module 1 and the cage 5 can be simplified.

<Regarding Shielding Portion 65>

In the above-described embodiments, the shielding portion 65 configured from the shielding plate 65A and the shielding seal 65B was provided in the movable cage 60. The shielding portion 65 may be configured with only the shielding plate 65A however. Further, instead of providing the shielding portion 65 in the movable cage 60, a shielding portion like a shutter may be provided to the front panel 4 side and the gap of the opening portion 4A may be blocked. Further, in the case where the electromagnetic noise is within a permissible range, the shielding portion 65 may be omitted.

What is claimed is:

1. A cage that a communication module having a module-side connector arranged two-dimensionally with connecting terminals is insertable to and removable from, the cage comprising:
   a movable cage that is rotatable about a rotation axis, the movable cage having an insertion opening to which the communication module is insertable and a window provided in a position of the module-side connector during insertion of the communication module,
   wherein:
   the movable cage switches between a first position and a second position by rotating;
   in the first position, an insertion direction of the communication module to the movable cage is slanted, with respect to a board arranged with a fixed-side connector having connecting terminals arranged two-dimensionally, and the communication module is insertable to and removable from the movable cage;
   in a case that the movable cage is made to be from the first position to the second position in a state in which the communication module is inserted, the module-side connector and the fixed-side connector are connected through the window;
   the rotation axis of the moveable cage is arranged in an opposite side to the insertion opening; and
   the window of the moveable cage is arranged nearer to the insertion opening than the rotation axis.

2. A cage that a communication module having a module-side connector arranged two-dimensionally with connecting terminals is insertable to and removable from, the cage comprising:
   a moveable cage that is rotatable about a rotation axis, the moveable cage having an insertion opening to which the communication module is insertable and a window provided in a position of the module-side connector during insertion of the communication module,
   wherein:
   the moveable cage switches between a first position and a second position by rotating;
   in the first position, an insertion direction of the communication module to the moveable cage is slanted with respect to a board arranged with a fixed-side connector having connecting terminals arranged two-dimensionally, and the communication module is insertable and removable from the movable cage;
   in a case that the moveable cage is made to be from the first position to the second position in a state in which the communication module is inserted, the module-side connector and the fixed-side connector are connected through the window;
   the cage further comprises a stopper fixed to the board;
   the movable cage has a slit;
   the stopper enters in the slit, in a case in which the movable cage is made to be from the first position to the second position; and
   the stopper that has entered in the slit inhibits insertion of the communication module from the insertion opening, in a case in which the movable cage is in the second position in a state where the communication module has not been inserted.

3. A cage according to claim 2, wherein
   in a state in which the communication module has not been inserted normally in the movable cage, a housing of the communication module to an inner side of the slit contacts the stopper, and thus the movable cage is inhibited from rotating from the first position to the second position, and in a state in which the communication module has been inserted normally in the movable cage, a groove portion formed in the housing is positioned to an inner side of the slit, the stopper enters in the slit and the groove portion, and thus the movable cage can be made to be from the first position to the second position.

4. A cage according to claim 2, wherein
the stopper is formed with a recess,
the communication module is arranged with a claw portion in the groove portion,
in the case in which the movable cage is made to be in the second position while in a state in which the communication module is inserted, the claw portion is entered in the recess, and the movable cage is fixed.

5. A cage according to claim 1, wherein
in the case in which the movable cage is made to be from the first position to the second position, the insertion opening moves within an opening portion of a front panel, and
a shielding portion to block a gap in the opening portion in the case in which the movable cage is in the second position is further included.

6. A cage according to claim 1, wherein
the connecting terminals are configured with a plate-shaped pin, and
a surface of the plate-shaped pin is in a direction perpendicular to the rotation axis.

7. A communication device comprising:
a fixed-side connector arranged on a board, the fixed-side connector being arranged two-dimensionally with connecting terminals;
a front panel that is perpendicular to the board; and
a cage that a communication module having a module-side connector arranged two-dimensionally with connecting terminals is insertable to and removable from, wherein:
the cage includes a movable cage that is rotatable about a rotation axis, the movable cage having an insertion opening to which the communication module is inserted and a window provided in a position of the module-side connector during insertion of the communication module;
the movable cage switches between a first position and a second position by rotating;
in the first position, an insertion direction of the communication module to the movable cage is slanted, with respect to the board, the communication module being insertable to and removable from the movable cage;
in a case in which the movable cage is made to be from the first position to the second position in a state in which the communication module is inserted, the module-side connector and the fixed-side connector are connected through the window;
the front panel has an opening portion; and
when the movable cage switches between the first position and the second position by rotating, the insertion opening of the movable cage moves within the opening portion of the first panel.

8. A communication module comprising:
a module-side connector;
a board arranged with the module-side connector; and
a housing that contains the board and that is shaped as insertable from an insertion opening of a cage, wherein:
the board is contained in the housing, in parallel with an insertion direction to the cage;
the module-side connector has connecting terminals arranged two-dimensionally on a connector surface in parallel with the board;
the housing has a window in parallel with the connector surface, the module-side connector being exposed from the window;
a side surface of the housing is formed with a groove portion in which a stopper provided to the cage side can enter;
the communication module further comprises a claw portion movable along the insertion direction, the claw portion being arranged and protruding from the groove portion;
the claw portion contacts the stopper and thus moves, enters in a recess of the stopper than has entered in the groove portion, and fixes the communication module;
the claw portion is provided to a lever operated by an operator; and
by operating the lever, the claw portion that has entered in the recess can be disengaged.

9. A communication module according to claim 8, wherein
the connecting terminals are configured with a plate-shaped pin,
a surface of the plate-shaped pin is in a direction perpendicular to the connector surface, and is also in a direction in parallel with the insertion direction.

10. A communication module according to claim 8, wherein
the board is sandwiched, from a direction perpendicular to a surface direction of the board, with a member configuring the housing,
in a case in which a force exceeding a friction force between the board and the housing is applied to the board, the board is movable in the surface direction with respect to the housing.

11. A connecting method to connect a connector by inserting a communication module in a cage, the method comprising:
making a movable cage that is rotatable about a rotation axis to be in a first position in which an insertion direction of the communication module is slanted with respect to a board arranged with a fixed-side connector having connecting terminals arranged two-dimensionally,
inserting, from an insertion opening of the movable cage, a communication module having a module-side connector arranged two-dimensionally with connecting terminals, and
rotating the movable cage from the first position to a second position while in a state in which the communication module is inserted, and connecting the module-side connector and the fixed-side connector,
wherein:
a front panel is provided perpendicular to the board;
the front panel has an opening portion; and
when the movable cage switches between the first position and the second position by rotating, the insertion opening of the movable cage moves within the opening portion of the front panel.

* * * * *